United States Patent [19]
Maxwell et al.

[11] Patent Number: 5,319,373
[45] Date of Patent: Jun. 7, 1994

[54] METHOD AND APPARATUS FOR DETERMINING SHIP POSITION IN A TELEVISION IMAGE

[76] Inventors: Robert M. Maxwell, 12 Woodridge Hills Rd., Old Lyme, Conn. 06371; David K. Barton, 180 Prospect Hill Rd., Harvard, Mass. 01451

[21] Appl. No.: 975,639

[22] Filed: Nov. 13, 1992

[51] Int. Cl.⁵ .................... G01S 13/86; G01S 7/56; G01S 13/93
[52] U.S. Cl. ........................ 342/55; 342/23; 342/41; 342/6; 342/7; 342/179
[58] Field of Search ............... 342/55, 23, 41, 6, 7, 342/179

[56] References Cited

U.S. PATENT DOCUMENTS

| | | | |
|---|---|---|---|
| 2,655,648 | 10/1953 | Schrader | 342/36 |
| 2,760,187 | 8/1956 | Stocker | 342/55 |
| 3,111,663 | 11/1963 | Stavis | 342/55 |
| 3,111,664 | 11/1963 | Gamertsfelder et al. | 342/55 |
| 3,121,223 | 2/1964 | Roberts et al. | 342/55 |
| 3,298,022 | 3/1965 | Smith | 342/55 |
| 3,308,464 | 3/1967 | Lewis | 342/6 |
| 3,404,397 | 10/1968 | Cooper | 342/55 |
| 3,417,398 | 12/1968 | Lewis et al. | 342/6 |
| 3,772,692 | 11/1973 | Braddon | 342/41 |
| 3,836,961 | 9/1974 | Ennis et al. | 342/55 |
| 4,071,843 | 1/1978 | Marien | 342/55 |
| 4,081,802 | 3/1978 | Elmore et al. | 342/55 |
| 4,218,326 | 7/1981 | Anderson | 342/41 |
| 4,314,249 | 2/1982 | Onoe | 342/6 |
| 4,336,539 | 6/1982 | Hendrickson | 342/55 |
| 4,419,669 | 12/1983 | Slager et al. | 342/6 |
| 4,660,046 | 4/1987 | Foral | 342/160 |
| 4,686,534 | 8/1987 | Eddy | 342/165 |
| 4,706,090 | 11/1987 | Hashiguchi et al. | 342/41 |
| 4,724,436 | 2/1988 | Johansen et al. | 342/7 |
| 4,843,396 | 6/1989 | Macikunas et al. | 342/7 |
| 5,008,677 | 4/1991 | Trigon et al. | 342/17 |
| 5,065,161 | 11/1991 | Shibutani | 342/176 |

OTHER PUBLICATIONS

"Radar Reflector with Bidirectional Communication Capability" Nozomu Hasebe, Hiroshi Sugiyama, Akio Kuramoto and Morio Onoe Electronics and Communications in Japan, Part 1, vol. 70, No. 2 1987–Translated from Denshi Tsushin Gakkai Ronbunshi, vol. 68–B, No. 10, Oct. 1985–pp. 1177–1184.

*Primary Examiner*—John B. Sotomayor

[57] ABSTRACT

Apparatus for detecting the position of a vessel in a broadcast image of the radar scan in a radar monitored area includes a television monitor for displaying a broadcast image of a radar scan of the area, and a controllable reflector for varying reflection of the radar waves impinging thereon from the monitoring radar to produce identifiable signal components in the broadcast image of the radar scan received on the television monitor. This controllable reflector may be actuated by the vessel operator to vary the reflection of the radar waves and produce variations in the broadcast image to enable the operator to identify the position of the vessel in the radar scan image appearing on the monitor. The monitoring installation includes a monitoring radar transmitter/receiver, and a television transmitter televising an image of the radar scan. Desirably, it includes a scan converter which receives the signals in polar coordinate form and provides rectangular raster signals with X and Y coordinates.

25 Claims, 3 Drawing Sheets

180° CAP

METHOD AND APPARATUS FOR DETERMINING SHIP POSITION IN A TELEVISION IMAGE

BACKGROUND OF THE INVENTION

The present invention relates to position monitoring systems for vessels and, more particularly, to a radar monitoring system which alloys a vessel to determine its position in a radar image of in the monitored area.

Because small craft, viewed from any distance, have their natural reflecting sources very near the sea surface, their radar echoes are severely reduced by propagation phenomena. The "propagation factor" for such targets may be as much as 20 to 40 dB below unity, so that the echo is that far below the echo from a similar object in free space, at the same range from the radar transmitted/receiver.

As a result, radar reflectors are commonly used to enhance the echo of small craft. Often these take the form of a cluster of cube corner reflectors supported in an elevated position to provide good reflection of radar raves transmitted from other vessels. Elevation of the reflector to a position near the top of the mast of a small sailboat or on a rover or mast on a power boat can reduce most or all of this loss, giving a clear echo to approaching ships and to land based radar. Use of such reflectors is recommended as a safety precaution for small craft operating in sea lanes and other areas traversed by radar equipped ships.

Although navigational radar units for small craft have become smaller and less expensive over the past several years, it has also been proposed to use a large, shore based radar station which broadcasts a radar display on a television channel to a relatively low cost television monitor on the vessels in the area. This would provide a reduction in the size, cost, and complexity of the small craft equipment. Thus, only a simple television receiver would be required to obtain the navigation display, and contamination of the electromagnetic spectrum by multiple radar installations can be avoided.

A major limitation of such radar/TV systems is the inability of a vessel to identify the echo on the display which represents it. To overcome this limitation, Schrader U.S. Pat. No. 2,655,648 and Stocker U.S. Pat. No. 2,760,187 proposed that each craft carry an active transponder to produce a distinctive signal. This not only imposes an economic burden on the user, but also creates additional interference in the radar band which could become severe if many transponder equipped users were present in one area.

Radiation from auxiliary antennas as a means of marking the location of the user's own craft on the display has been proposed in Stavis U.S. Pat. No. 3,111,663, Gamertsfelder et al U.S. Pat. No. 3,111,664 and Roberts et al U.S. Pat. No. 3,121,223.

If the television scanning and transmission are synchronized with the radar scan, rather than having the TV system operating in its normal raster mode, the radar beam passing across the target may be detected by a supplementary receiver, and the output of that receiver used to brighten the display along the line pointing to the target echo, as shown in Smith U.S. Pat. No. 3,298,022, Cooper U.S. Pat. No. 3,404,397, Ennis et al U.S. Pat. No. 3,836,961 and Hendrickson U.S. Pat. No. 4,336,539. However, this requires a specialized TV transmission and receiving system, operating with a polar coordinate scan.

Assuming that a radar reflector provides an adequate echo for land based navigational radar monitoring the area, the navigator's problem remains that of identifying the vessel's own echo in a display filled with echoes from other craft. If the reflector were easily reached, it could be covered briefly and intermittently with an absorbing material to give sharp reductions in the echo signal. However, the reflector should be high on the mast, or as high as possible on a powered craft, and accordingly not readily accessible to the navigator. Electrical control is most desirable, so that the reflector can be modulated briefly when a pushbutton is depressed by the navigator. Then, having recognized the echo return from the vessel, the operator could return the reflector to its normal operation as a passive safety device, leaving the same identification capability available to other users without confusion.

Accordingly, it is an object of the present invention to provide a novel assembly for placement upon a vessel enabling determination of its position within a televised image of a radar scan of a monitored area.

It is also an object to provide such an assembly wherein the determination procedure is effective without additional transmission or reception of special signals by the using vessel or the base station.

Another object is to provide a vessel monitoring system utilizing a base station which is relatively low cost to equip and which may be operated automatically and at relatively low cost.

SUMMARY OF THE INVENTION

It has now been found that the foregoing and related objects may be readily attained in an apparatus for detecting the position of a vessel in a broadcast television image of the radar scan of a radar monitored area, comprising a television monitor for displaying a broadcast television image of the radar scan of the area, and a controllable reflector to vary the reflection of the radar waves impinging thereon from the monitoring radar installation to produce an identifiable signal component in the broadcast image of the radar scan received on the television monitor. The controllable reflector may be actuated to vary the reflection of the radar waves and produce variations in the broadcast image to enable the operator to identify the position of the vessel in the radar scan image appearing on the monitor.

Preferably, the reflector includes at least one reflective cube corner defined by three planar surfaces and means for altering the reflectivity of the reflective cube corner relative to a scanning radar beam. A control unit is coupled thereto and comprises a switch and a signal generator for generating signals to actuate the altering means. Desirably, the reflector includes an amplifier for the signals from the control unit.

In one embodiment, a radar wave interceptor is disposed in spaced relationship to the reflective cube corner, and it includes a dielectric material switchable between reflecting and transmitting states in response to the signals from the control unit. The interceptor has a multiplicity of dipoles spaced about its surface, each of which is approximately one-half the wavelength of the frequency of the scanning radar beam and has a diode disposed therebetween. When the diode is biased to a non-conducting state, it creates quarter-wave dipoles to permit the radar waves to pass through the interceptor and be reflected by the cube corner; when biased to a conducting state, the radar waves are reflected from the surface of the interceptor.

The dipoles are generally disposed in a horizontal orientation, and isolated vertical conductors with small inductors are provided on the interceptor to drive the diodes, and an inductor is provided across each diode to tune out the capacitance of the diode.

In another embodiment, two grids of dipoles are placed one-quarter wavelength from each side of one of the three planar surfaces of the cube corner. These dipoles are spaced approximately one wavelength apart and diodes are disposed therebetween. When conducting, the diodes cause a phase shift of 180° in half the energy of the radar waves impinging on the dipoles and cancel the reflection of the other half of the energy. When biased to a non-conducting state, the diodes permit the radar waves to be reflected.

The radar monitoring assembly includes a radar monitoring transmitter/receiver scanning the area to be monitored and providing an image of the radar scan of the area, and a television transmitter for televising the image of the radar scan.

Preferably, there is included a scan converter receiving the radar receiver signals from the transmitter/receiver in polar coordinate form and providing to the television transmitter rectangular raster signals with X and Y coordinates. Desirably, the scan converter retains the intensity of the modulation of the echos to permit discrimination of elements in the broadcast image.

In a preferred embodiment, the television transmitter transmits both displays of the entire monitored area and enlarged displays of portions of the monitored area. The monitor desirably includes a selector circuit to select an enlarged display. Moreover, the television transmitter overlays navigational features on the transmitted radar image.

BRIEF DESCRIPTION OF THE ATTACHED DRAWINGS

DETAILED DESCRIPTION OF THE PREFERRED EMBODIMENT

Figure 1:
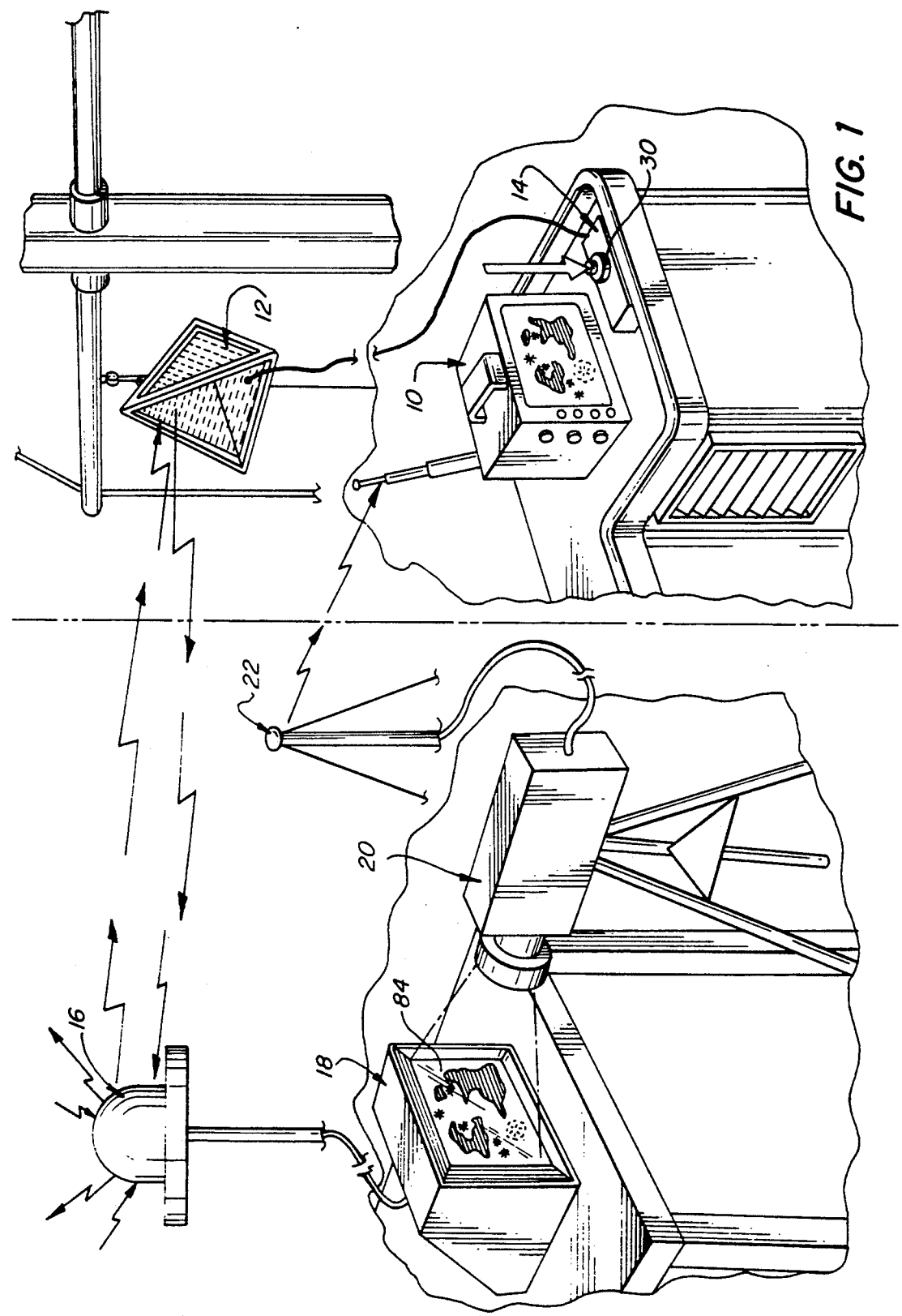
FIG. 1 is a diagrammatic illustration of a complete installation embodying the present invention and including the components of the shoreside radar monitoring assembly and the components of the onboard assembly for position determination.

Turning first to FIG. 1, therein illustrated is a complete installation embodying the present invention and including the the components aboard the vessel comprising a television monitor generally designated by the numeral 10, a radar reflector generally designated by the numeral 12, and a control unit generally designated by the numeral 14 which can vary the reflectance of the reflector 12.

The shore based radar installation monitoring the area includes the radar antenna 16, the radar transmitter/receiver generally designated by the numeral 18, the television signal transmitter schematically illustrated by the camera 20, and the television signal transmission antenna 22.

To produce a normal television picture of the radar display, a scan converter is used in the television signal transmitter 20 at the shore station, accepting as input the video output of the radar receiver 18 in polar coordinate form, i.e., range (time delay) v. bearing. The output to the TV transmitter antenna 22 is video signals representing a rectangular raster: X (east-west) and Y (north-south) coordinates, with intensity modulation carrying the echo intensity to show land features, navigational markers such as buoys, and fixed or moving craft. The television monitor 10 on the vessel then operates as it would for any normal TV picture channel. To provide a bright display, the TV frame rate may be set to the normal 30 Hz rate, typically giving 120 complete picture transmissions during the four second scan period of the monitoring radar 18.

As seen in FIG. 1, the reflector 12 is hung from the spreader 24 on the mast 26 of a sailing vessel, thus placing it at an elevated position. A cable 28 is connected thereto from the control 14 which is actuated by the push button 30. In this embodiment, the reflector 12 is a cube corner reflector which is shown in greater detail in FIG. 2.

Figure 9:
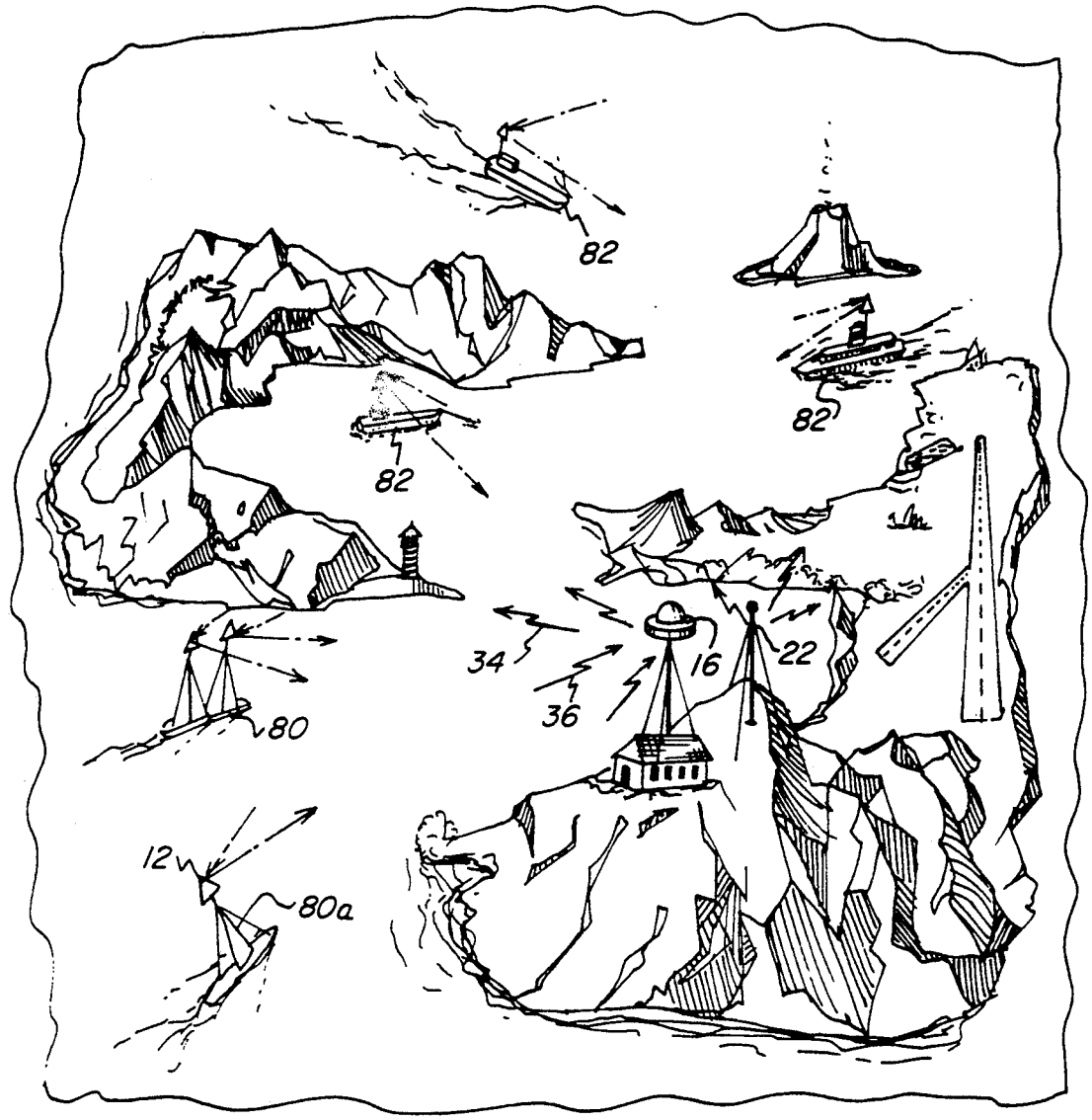
FIG. 9 is a schematic illustration of an area being monitored by the radar monitoring assembly of the present invention.

As seen in FIG. 9, the radar waves 34 from the transmitter antenna 16 are sent out to blanket the monitored area. Typically, the radar beam 34 scans the area every four seconds in a 360° sweep; if so desired, the sweep angle can be limited. Two sailing vessels 80 and three motor vessels 82 have radar reflectors 12 mounted thereon and return reflected radar waves 36 to the antenna 16. In addition, the radar waves from the antenna 16 pick up geographic features and navigational aids in the area. A radar image of the area is developed on the monitor 84 of the shore display 18 (seen in FIG. 1), and is broadcast by television camera 20 and the antenna 22.

The vessel 80a, which is desirous of identifying itself in the image received on its monitor 10 (seen in FIG. 1) actuates its control 14 to alternatively enable and disable its reflector 12 (both seen in FIG. 1), thus producing an intermittent radar image or blip on its monitor 10 and allowing it to determine its position.

Figure 2:
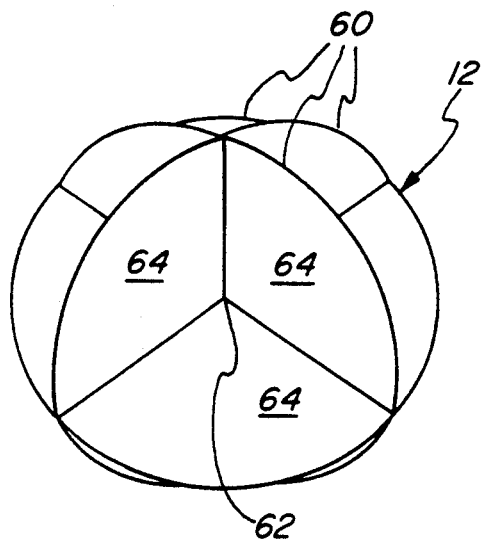
FIG. 2 is an illustration of a typical cube corner reflector of the type employed on small vessels.

As seen in FIG. 2, the reflector 12 comprises three assembled discs 60 providing a total of 8 cube corner intersections 62 each defined by three orthogonal planar surfaces 64.

On small craft, where economy of equipment and power usage is of particular importance, a major portion of the radar echo can be produced by a small (e.g., 32 cm diameter) cube corner reflector cluster, located in an elevated position, e.g., on the mast or a pole. If the reflector 12 on the vessel is switched on and off on alternate scans of the shore based radar, or switched at a rate that will produce a characteristic pattern on the radar display seen on the monitor 10, the echo of the user's craft can be identified as a periodically modulated echo.

Modern solid-state diode devices permit this switching to be performed at a rate determined by the user. In order to avoid confusion among multiple modulated echoes, each user should effect this modulation only briefly when he or she wishes to establish the vessel's identity on the display. This may be done with a push button switch 30 at the control 14, which enables the modulation for one scan period of the radar. The display on the monitor 10 does not indicate the present position of the radar beam, but reflector modulation lasting for one scan period ensures that the echo will be modulated during the period following push button operation.

Figure 3:
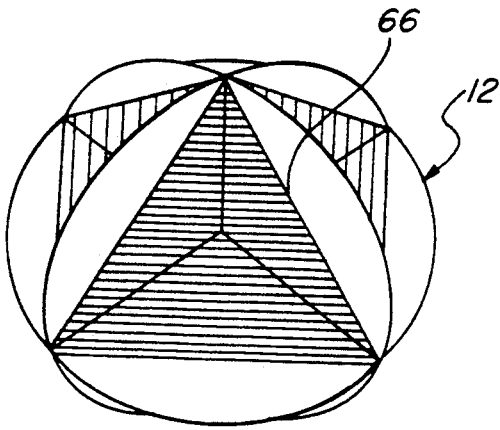
FIG 3 is a view of such a reflector which has been provided with interceptor elements to allow modulation of its reflectance.

Seen in FIG. 3 is one embodiment of a modulating reflector 18 for use in the present invention. A planar interceptor 66 extends between the orthogonal planar surfaces 64 along lines spaced equidistantly from the intersection 62, and it alternately permits radar waves to pass therethrough or reflects such waves from its surface.

Modern printed antenna technology makes available a number of designs for surfaces whose transmission or reflection properties in given frequency bands can be modified by controlling the bias on embedded solid-state diode devices. For example, small dipoles, tuned to resonate in a given band, may be printed on a plastic sheet. Diodes placed at the center of each dipole can connect the two halves when biased "on", and disconnect them when "off". The surface will then reflect strongly when "on", and transmit that frequency band with little loss when "off". The control current can be supplied by a network of fine wires oriented normal to the expected polarization of the radar waves. Alternatively, a periodic grid of conductors can be mounted on a plastic surface $\lambda/4$ in front of on of the three solid surfaces of the corner, with diodes arranged such that reflection from that surface is canceled when bias is applied. In this case, the control wires are placed behind the solid surface, where they do not affect the signal.

Figure 4:
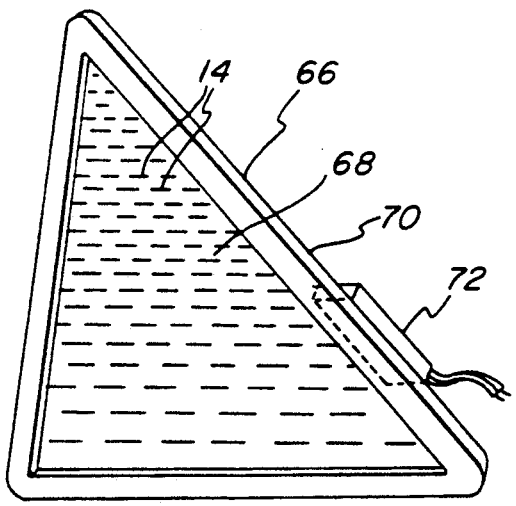
FIG. 4 is an illustration of an interceptor element.

As seen in detailed FIG. 4, the interceptor 66 comprises a sheet 68 of dielectric material within a triangular frame 70 used to mount it to the cube corner reflector 12. Also shown is an amplifier 72 receiving signals from the control unit 14 which control the dipoles 74 which are diagramatically illustrated as being short lines disposed horizontally across the surface of the sheet 68.

Figure 5:
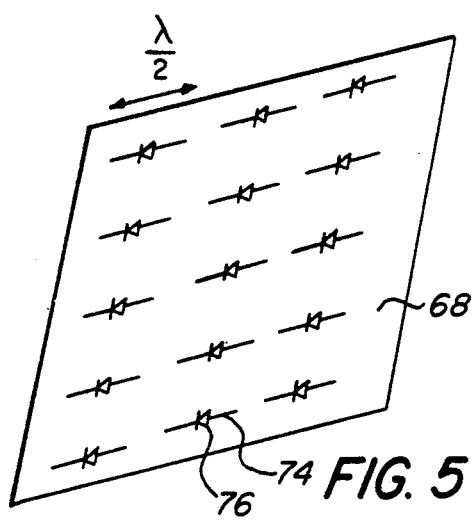
FIG. 5 is an illustration of the dielectric sheet used in the interceptor element showing diagramatically dipoles and diodes to effect the variation and reflectance of the cube corner reflector.

The schematic illustration in FIG. 5 shows the dipoles 74 printed upon the surface of the sheet 68 in closely spaced, horizontal orientation with diodes 76 disposed between the two elements of each dipole 74 to produce two quarter wave dipoles when biased to a non-conducting state.

Figure 6:
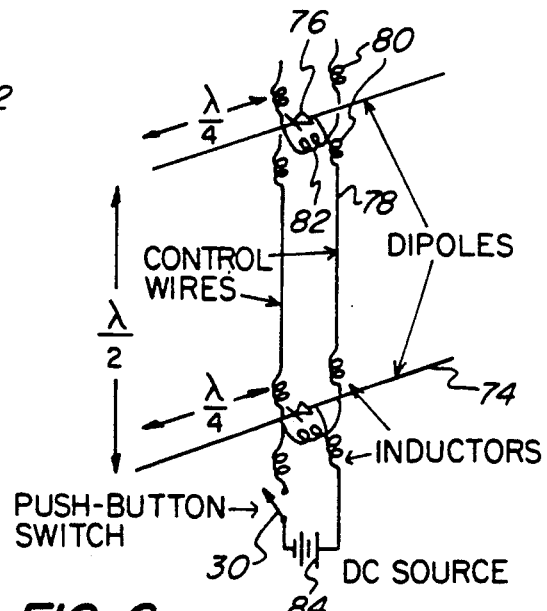
FIG. 6 is a schematic illustration of the electrical circuitry for the interceptor element to provide biasing current to the diodes of the sheet of FIG. 5.

In FIG. 6, there is illustrated a printed circuit which includes the vertical conductors 78 which are electrically isolated at the radar wave frequency by small inductors 80. Also provided across the diodes 76 are small inductors 82 which short out the capacitance of the diode 76 to create a high impedance circuit when the diode 76 is non-conducting. The DC power source 84 and switch 30 of the control 14 are also illustrated (although the amplifier 72 is not).

Assuming that the radar operates with horizontally polarized transmissions, the dielectric sheet 68 with printed metallic horizontal dipoles 74 is placed in front of each cube corner of the cluster reflector 12. The dipoles 74 are spaced by approximately one-half wavelength, vertically and horizontally, and hence will appear as a continuous surface to the incident wave. The dipoles 74 are resonant in the radar frequency band (each dipole has a length of one-half wavelength), but the solid state diode 76 at the center permits them to be separated at that point when the diode is biased to the non-conducting state, thus creating two quarter wave dipoles. The quarter-wave dipoles interact only weakly with the incident waves, permitting them to pass through the sheet 68 and to reflect from the cube corner reflector cluster with essentially no effect upon them. By orienting the inteceptor 66 at an angle to the vertical, the surface of the dielectric sheet 68 will reflect signals other than toward the radar antenna 16, when the diodes 76 are in the conducting state. This orientation will be the natural situation if the triangular interceptor 66 is attached to the reflector 12 with its corners equidistantly spaced from the cube corner 62.

It will be appreciated that other types of controllable surface could be used, including long strings of segmented conductors, connected by diodes, arrays of crossed dipoles to cover radar signals of all polarizations, and other patterns as necessary to obtain the desired "off-on" ratio of transmission or reflection.

Exemplary of a suitable retroreflector of this embodiment are the following specifications:

The cube corner reflector shown in FIG. 2 is provided with 8 interceptor sheets each consisting of a flat sheet of material capable of being switched electrically between two states: reflecting and transmitting. The driver amplifier is capable of accepting input switching commands of zero volts (for transmission mode) or plus one volt (for reflection mode).

The sheet is $30 \times 30 \times 30$ cm (nominal) and of any thickness which will meet electrical specifications. The operating frequency is 9.4 to 9.5 GHz, and the polarization is linear.

In the transmission mode, at least 80% of incident radar waves is transmitted through the sheet when incident at angles $\pm 45°$ from normal on either side of sheet. In the reflection mode, at least 80% of the incident radar waves are reflected from the sheet when incident at angles $\pm 45°$ from normal.

The signal consists of a square wave at frequencies from 0.1 to 200 Hz, and the response of the interceptor sheet (from transmission to reflection mode) occurs within 1 ms after each change in input state. The switching signal is supplied through screw terminals mounted on the drive amplifier which is coupled to electrical conductor paths on each of the interceptor sheets.

The power input in the transmission mode to the reflector and its drive amplifier should require not more than 0.1 ampere at 12 or 24 vdc. In the reflection mode, the power input should not require more than 1.0 ampere. Power is supplied by the user to screw terminals mounted on the drive amplifier. The reflector and its drive amplifier should not exceed 0.5 kg in weight.

Figure 7:
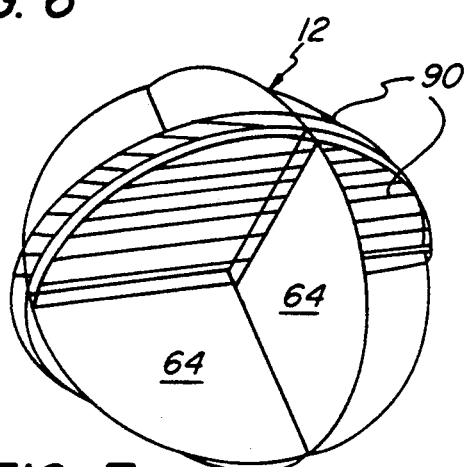
FIG. 7 is a schematic illustration of an alternate embodiment of a cube corner reflector with variable reflectance.

Turning now to FIG. 7, therein illustrated is an alternate embodiment of a switched reflector which has two grids 90 of dipoles spaced one quarter wavelength on each side of one of the three reflector surfaces 64 of each cube corner array. These dipoles are spaced approximately one wavelength apart, so that one-half the incident wave energy impinges on the dipoles which cause a phase shift of 180°, cancelling the reflection of the other half of the wave energy which is reflected from the underlying surface 64. As in the case of the switched interceptor sheet in the prior embodiment, biasing the diodes to a non-conducting state makes them essentially invisible to the incident radar waves, and normal reflection from the cube corner surfaces occurs. An advantage to the embodiment of FIG. 7 is that the control wiring is placed directly on the surface of the reflector, and it may be formed as a series of printed conductors on a dielectric sheet which serving as a reflector for the radar waves but isolates the two sides of the DC control circuit, as schematically illustrated in FIG. 9. Because the corner reflector depends on triple bounce reflection, only one of the three intersecting surfaces 64 is required to be a dielectric sheet. As a result, the total number of dipoles is reduced by a factor of nearly four, as compared to the interceptor sheet of the prior embodiment.

Figure 8:
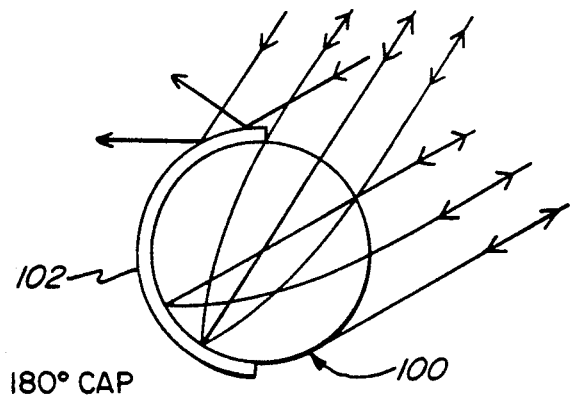
FIG. 8 is a schematic illustration of still another type of reflector which may be utilized in the practice of the present invention.

Still another electronically activated reflector is seen in FIG. 8 wherein a Luneberg lens 100 has a reflecting cap 102 which is printed with a diode array as in the prior embodiments. Here the cap 102 is reflecting even if no biasing current is applied whereas the prior embodiments require the application of current to bias the diodes to a conducting state to provide the desired retroreflection.

It will be appreciated that the desired alternation of a reflector 12 between reflecting and non-reflecting states may also be accomplished mechanically such as by a reciprocating shutter or screen which functions as an interceptor to reflect the radar beam at an angle to the source direction, or a structure which collapses or alters the cube corner configuration, or any other suitable means. Other techniques rotates a directionally limited retroreflector about a horizontal axis, or pivot the retroreflector in a vertical plane, both functioning to alter its effectiveness as a retroreflector for radar waves from a known direction. These mechanical actions can be done by a motor controlled by a switch, or manually.

The harbor navigation system uses a conventional, high resolution marine radar, based on land and having coverage over the desired harbor and its approach routes. The radar PPI display is scan converted for transmission on conventional television equipment, presumably operating in one of the UHF channels allocated to local services. It is anticipated that this radar and its associated TV transmitter could be operated by a government agency, or by a private group providing the transmission as a service to subscribers who would pay a fee for receiving the transmission. In the case of private operation, the transmission would be encoded, and subscribers would be provided with the necessary decoder, as currently used in cable TV operations.

In order to make the identification clearer to the viewer of the display, it would be desirable to apply the modulation as a square wave with a period equal to ¼ to ½ times the time required for the radar antenna to scan through its azimuth beamwidth. Typically, this time will be in the order of 0.006 second, for a 0.05° beam scanning 360° in 4 seconds. The square wave would then have a period of 0.002 to 0.003 seconds, and would break the returned echo into three or four discrete sections, each about 0.1° to 0.15° wide on the display. Depending on the display resolution, the modulation period could be adjusted to provide a visible indication within a single scan. It would be desirable to include a "zoom" feature on the TV display, permitting the navigator to expand the region around his or her estimated position and improving both the identification function and navigation with respect to nearby objects.

The picture available from a high resolution marine radar would be considerably better than that provided by most small craft radars, and could include synthetically generated navigation data of the type used by FAA controllers such as traffic lanes, hazard indicators, identification of fixed landmarks, etc. All fixed and moving craft would be displayed and the navigator would be able to use these data for avoidance of collisions as well as navigation into or out of harbor.

In addition to the navigational purposes heretofore described, the present invention may also be applied to facilitate the location of vessels in distress. The controllable reflector of the present assembly may be actuated to produce an identifiable echo on the radar screen of a vessel seeking to provide aid to the vessel in distress. This could take the form of a fixed sequence of on/off signals which would uniquely identify a vessel in distress among other returning echos.

Thus, it can be seen from the foregoing detailed specification and attached drawings that the position monitoring system of the present invention enables vessels to utilize a relatively low cost retroreflector and television monitor to ascertain their position within a radar monitored area. The monitoring may be effected by a relatively low cost radar monitoring station which is operable automatically and at relatively low cost to send televised signals of the radar scan in which the vessel is identified by operation of its radar reflector to vary its reflectance and thus its image in the broadcast display of the radar scan.

We claim:

1. A shipboard installation for detecting the position of a vessel in a broadcast television image of the radar scan of a radar monitored area, comprising the combination of:
   (a) a television monitor for displaying to a navigator a broadcast television image of the radar scan of the radar monitored area;
   (b) a controllable radar reflector to vary the reflection of the radar waves impinging thereon from a monitoring radar installation; and
   (c) control means for said radar reflector operable by the navigator to produce an identifiable signal component in a broadcast image of the radar scan received on said television monitor whereby said controllable reflector may be actuated by the navigator to vary the reflection of the radar waves and produce variations in the broadcast image to enable the navigator to identify the position of the vessel in the radar scan image appearing on said monitor.

2. The position detection apparatus in accordance with claim 1 wherein said reflector includes at least one reflective cube corner defined by three planar surfaces and means for altering the reflectivity of said reflective cube corner relative to a scanning radar beam.

3. The position detection apparatus in accordance with claim 2 wherein said control means includes a control unit comprising a switch and a signal generator for generating signals to actuate said altering means.

4. The position detection apparatus in accordance with claim 3 wherein said reflector includes an amplifier for said signals from said control unit.

5. The position detection apparatus in accordance with claim 3 wherein a radar wave interceptor is disposed in spaced relationship to said reflective cube corner, said interceptor including a dielectric material switchable between reflecting and transmitting states in response to said signals from said control unit.

6. The position detection apparatus in accordance with claim 5 wherein said interceptor has a multiplicity of dipoles spaced about its surface, each of which is approximately one-half the wavelength of the frequency of the scanning radar beam and has a diode disposed therebetween which, when biased to a non-conducting state, creates quarter-wave dipoles to permit the radar waves to pass through the interceptor and be reflected by the cube corner and which, when biased to a conducting state, reflects the radar waves from the surface of said interceptor.

7. The position detection apparatus in accordance with claim 6 wherein said dipoles are disposed in a horizontal orientation.

8. The position detection apparatus in accordance with claim 7 wherein isolated vertical conductors with small inductors are provided on the interceptor to drive the diodes, and wherein an inductor is provided across each diode to tune out the capacitance of the diode.

9. The position detection apparatus in accordance with claim 3 wherein two grids of dipoles are placed one-quarter wavelength from each side of one of said three planar surfaces of said cube corner, said dipoles being spaced approximately one wavelength apart and having diodes disposed therebetween, said diodes, when conducting, cause a phase shift of 180° in half the energy of the radar waves impinging on the dipoles and cancelling the reflection of the other half of the energy when biased to a non-conducting state to permit the radar waves to be reflected.

10. A radar monitoring assembly enabling vessels to determine their position within a radar monitored area comprising:
(a) a radar monitoring installation including
  (i) a radar monitoring transmitter/receiver scanning an area to be monitored and providing an image of the radar scan of the area being monitored;
  (ii) a television transmitter for televising said image of the radar scan; and
(b) a shipboard installation including
  (i) a television monitor for displaying to a navigator the televised image of the radar scan;
  (ii) a controllable radar reflector to vary the reflection of the radar waves impinging thereon from said monitoring transmitter/receiver; and
  (iii) control means for said radar reflector operable by the navigator to produce an identifiable signal component in said radar scan and said televised image thereof received on said television monitor,
whereby said controllable reflector may be actuated to vary the reflection of the radar waves and produce variations in the broadcast image to enable the navigator to identify the position of the vessel in the radar scan image appearing on said monitor.

11. The radar monitoring assembly in accordance with claim 10 wherein said monitoring installation includes a scan converter receiving the radar receiver signals from said transmitter/receiver in polar coordinate form and providing to said television transmitter rectangular raster signals with X and Y coordinates.

12. The radar monitoring assembly in accordance with claim 11 wherein said scan converter retains the intensity of the modulation of the echos to permit discrimination of elements in the broadcast image.

13. The radar monitoring assembly in accordance with claim 10 wherein said reflector includes at least one reflective cube corner defined by three planar surfaces and means for altering the reflectivity of said reflective cube corner relative to a scanning radar beam.

14. The radar monitoring assembly in accordance with claim 13 wherein said control means includes a control unit comprising a switch and a signal generator for generating signals to actuate said altering means.

15. The radar monitoring assembly in accordance with claim 14 wherein said reflector includes an amplifier for said signals from said control unit.

16. The radar monitoring assembly in accordance with claim 14 wherein a radar wave interceptor is disposed in spaced relationship to said reflective cube corner, said interceptor including a dielectric material switchable between reflecting and transmitting states in response to said signals from said control unit.

17. The radar monitoring assembly in accordance with claim 14 wherein two grids of dipoles are placed one-quarter wavelength from each side of one of said three planar surfaces of said cube corner, said dipoles being spaced approximately one wavelength apart and having diodes disposed therebetween, said diodes, when conducting, cause a phase shift of 180° in half the energy of the radar waves impinging on the dipoles and cancelling the reflection of the other half of the energy when biased to a non-conducting state to permit the radar waves to be reflected.

18. The radar monitoring assembly in accordance with claim 10 wherein said television transmitter transmits both displays of the entire monitored area and enlarged displays of portions of the monitored area.

19. The radar monitoring assembly in accordance with claim 18 wherein said monitor includes a selector circuit to select an enlarged display.

20. The radar monitoring assembly in accordance with claim 10 wherein said television transmitter overlays navigational features on the transmitted radar image.

21. A shipboard installation for detecting the position of a vessel in the radar scan image of a radar monitored area, the combination comprising:
(a) a radar monitor for displaying to a navigator an image of a radar scan of the radar monitored area;
(b) a controllable radar reflector adapted to be mounted upon a vessel and including electronic means which may be actuated to vary the reflection of the radar waves impinging thereon from the radar monitoring installation; and
(c) control means for said radar reflector operable by the navigator to activate said electronic means and produce an identifiable signal component in the image of the radar scan received on said radar monitor,
whereby such controllable reflector may be actuated by the navigator to vary the reflection of the radar waves and produce variations in the radar scan image to enable identification of the position of the vessel in the radar scan image appearing on said radar monitor.

22. The position detection apparatus in accordance with claim 21 wherein said reflector includes at least one reflective cube corner defined by three planar surfaces and said means is adapted to alter the reflectivity of said reflective cube corner relative to a scanning radar beam, and a control unit comprising a switch and a signal generator for generating signals to actuate said altering means.

23. The position detection apparatus in accordance with claim 22 wherein a radar wave interceptor is disposed in spaced relationship to said reflective cube corner, said interceptor including a dielectric material switchable between reflecting and transmitting states in response to said signals from said control unit.

24. The position detection apparatus in accordance with claim 23 wherein said interceptor has a multiplicity of dipoles spaced about its surface, each of which is approximately one-half the wavelength of the frequency of the scanning radar beam and has a diode disposed therebetween which, when biased to a non-conducting state, creates quarter-wave dipoles to permit the radar waves to pass through the interceptor and be reflected by the cube corner and which, when biased to a conducting state, reflects the radar waves from the surface of said interceptor.

25. The position detection apparatus in accordance with claim 22 wherein two grids of dipoles are placed one-quarter wavelength from each side of one of said three planar surfaces of said cube corner, said dipoles being spaced approximately one wavelength apart and having diodes disposed therebetween, said diodes, when conducting, cause a phase shift of 180° in half the energy of the radar waves impinging on the dipoles and cancelling the reflection of the other half of the energy when biased to a non-conducting state to permit the radar waves to be reflected.

* * * * *